United States Patent [19]

Tsuzura

[11] 4,217,943
[45] Aug. 19, 1980

[54] LUG TIRE FOR AGRICULTURAL MACHINES

[75] Inventor: Junichi Tsuzura, Urawa, Japan

[73] Assignee: Bridgestone Tire Company Limited, Tokyo, Japan

[21] Appl. No.: 967,755

[22] Filed: Dec. 8, 1978

[30] Foreign Application Priority Data

Dec. 28, 1977 [JP] Japan .............. 52/175630[U]

[51] Int. Cl.² .............................................. B60C 11/08
[52] U.S. Cl. ................................................ 152/209 B
[58] Field of Search .......... 152/209 R, 209 D, 209 B, 152/209 A, 32 Y, 325, 352; D12/149, 147, 148, 140, 152

[56] References Cited

U.S. PATENT DOCUMENTS

| | | | |
|---|---|---|---|
| D. 104,503 | 5/1937 | Partenheimer | 152/209 D |
| D. 219,799 | 1/1971 | Sons, Jr. | D12/146 |
| 3,841,373 | 10/1974 | Gilreath | 152/209 R |
| 4,131,148 | 12/1978 | Bertazzoli et al. | D12/151 |

*Primary Examiner*—Michael W. Ball
*Attorney, Agent, or Firm*—Sughrue, Rothwell, Mion, Zinn and Macpeak

[57] ABSTRACT

A lug tire for agricultural machines comprising lugs arranged in herringbone pattern on both sides of an annular tread of a toroidal shaped carcass and spaced apart from each other by a distance which is at least 1.5 times larger than the surface width of the lug located at the outer end position of the tread, characterized in that said lug has a center region having a width corresponding to 15% to 30% of the maximum width of the tread inclusive of the lug and extending in parallel with the tire axis and a side portion region starting from the center region and inclined at an angle of at least, 15° with respect to the tire axis.

3 Claims, 3 Drawing Figures

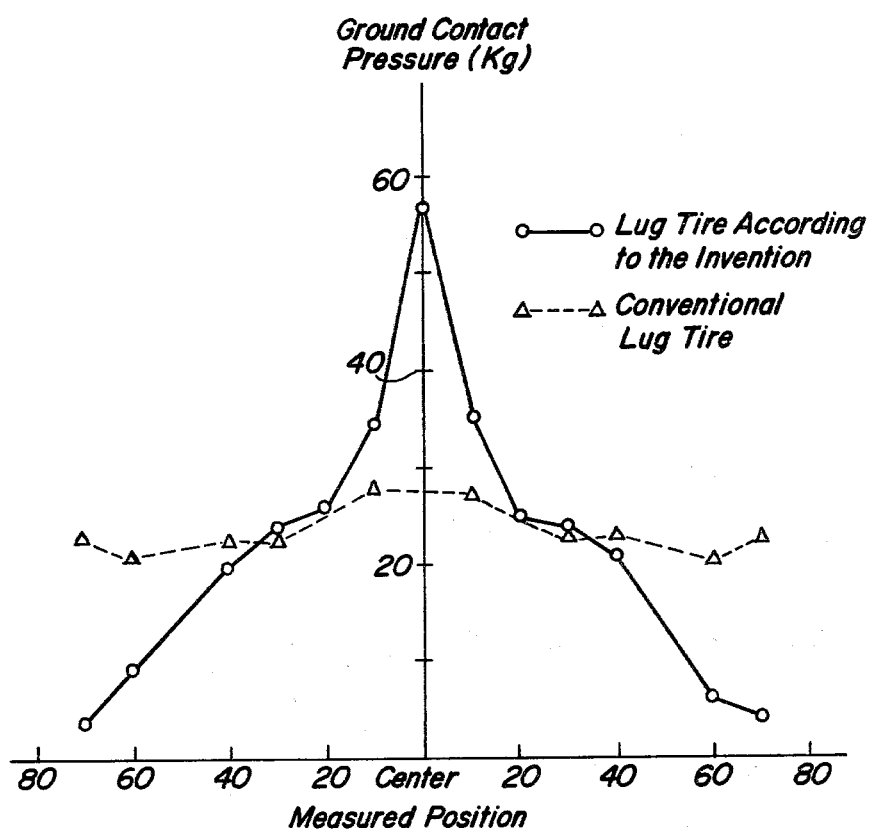

LUG TIRE FOR AGRICULTURAL MACHINES

BACKGROUND OF THE INVENTION

1. Field of the Invention

This invention relates to a lug tire for agricultural machines.

2. Description of the Prior Art

A tire for agricultural machines serves to effect a traction operation on off-road conditions contrary to a tire for passenger cars or trucks and buses which run on improved roads. As a result, a tire mounted on a driving wheel of the agricultural machine is provided with bar-shaped lugs each projected from a tread center portion to a tread end portion and spaced apart from each other in the circumferential direction of the tire by a transverse groove. In addition, the tire for agricultural machines is of a so-called high lug tire whose lug has a height which is considerably higher than that of the tire for trucks and buses.

In such kind of conventional lug tire, the shape of the outer surface of the lug as a whole is substantially circular or flat in section. The use of the lug having the above mentioned shape results in an increase of the ground contact pressure subjected not only to the tread center portion of the lug but also to the tread end portions of the lug when the tire runs. Hence it provides the disadvantage that the vibrations of the tire produced when it runs become large, the handling becomes deviated and heavy, and the carcass cord tends to be broken at the root position of the lug.

SUMMARY OF THE INVENTION

An object of the invention, therefore, is to provide a lug tire for agricultural machines which can eliminate the above described drawbacks which have been encountered with the prior art techniques.

Experimental tests have demonstrated that the use of an inclined lug in the tread side regions ensures a decrease of the ground contact pressure in the end regions of the lug. Hence the above mentioned drawback can be eliminated.

A feature of the invention is the provision of a lug tire for agricultural machines comprising a toroidal shaped carcass, an annular tread of the carcass, a pair of side wall portions extending radially and inwardly from both ends of the tread. A pair of bead portions are located at both ends of the side wall portions and lugs are arranged in herringbone pattern on both sides of the tread and spaced apart from each other by a distance which is at least 1.5 times larger than the surface width of the lug located at the outer end position of the tread. The lug has a center region having a width corresponding to 15% to 30% of the maximum width of said tread inclusive of the lug and extending in parallel with the tire axis and a side portion region starting from said center region and inclined at an angle of at least 15° with respect to the tire axis.

Further objects and advantages of the invention will be fully understood from the following detailed description with reference to the accompanying drawings, in which:

BRIEF DESCRIPTION OF THE DRAWINGS

FIG. 3 is a graph showing a ground contact load distribution curve of a lug tire embodying the invention as compared with that of the conventional lug tire.

DETAILED DESCRIPTION OF THE PREFERRED EMBODIMENTS

Figure 1:
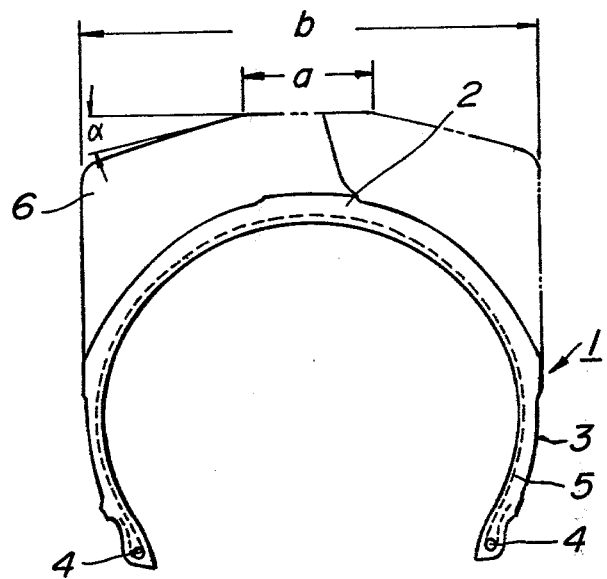
FIG. 1 is a cross-sectional view of a lug tire embodying the present invention.
Figure 2:
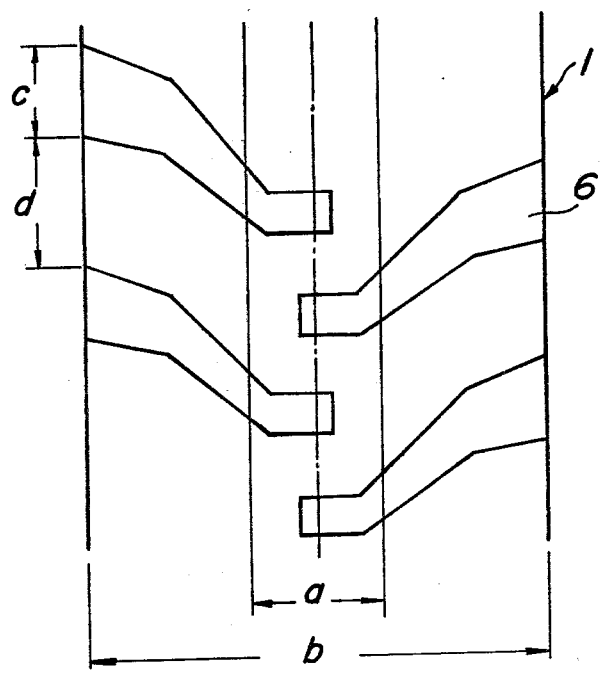
FIG. 2 is a partial plan view of the tire shown in FIG. 1.

FIG. 1 is a cross-sectional view of a lug tire embodying the invention and FIG. 2 is its partial plan view. In FIGS. 1 and 2, reference numeral 1 designates a tire provided at its center part with a tread 2 which extends through side portions 3 toward bead portions 4 located at both end portions of the tire. Between the bead portions 4 is arranged a toroidal shaped carcass 5 which serves to reinforce the tire as a whole. Lugs 6 are arranged in herringbone pattern on both sides of the tread. Adjacent parallel lugs 6 at the outer end positions thereof are spaced apart from each other by a distance d which is at least 1.5 times larger than a surface width c of the lug 6 at the outer end position thereof.

In such kind of conventional lug tire, the configuration of the the outer surface of the lug is substantially circular or flat in section. In the lug tire embodying the invention, that center region a of the lug which corresponds to 15% to 30% of the maximum tread width b inclusive of the lugs is made substantially parallel with the tire axis.

Experimental tests have demonstrated that within the above mentioned center range oscillations of the tire produced when it runs become alleviated and that it is possible to prevent handling from becoming heavy.

The side portion region of the lug interposed between the center region and the end portion of the lug is inclined at an angle $\alpha$ of at least 15°, preferably 15° to 25° with respect to the tire axis.

If this inclined angle is smaller than 15°, the lug tire embodying the invention could not obtain the desired result and hence oscillations produced when the tire runs become large and the handle becomes heavy. On the contrary, if the inclined angle is larger than 25°, the effective tread width becomes narrow and the both end portions of the tread are not brought into contact with the ground.

FIG. 3 is a graph showing experimental test results of obtaining a ground contact pressure distribution curve of a lug tire embodying the invention as compared with that of the conventional lug tire. In an experimental test, use was made of both the lug tire embodying the invention and the conventional lug tire comprising a carcass composed of 2 nylon cord plies and having a size of 6-14 4PR, both the tires being inflated by an internal pressure of 2.0 kg/cm$^2$ and subjected to 300 kg load. The ground contact pressure shall be understood to mean a total sum of a pressure subjected to width of 10 mm on a hard plate located in the ground contact plane and a pressure subjected to width of 10 mm on the hard plate in the circumferential direction. The lug tire embodying the invention was constructed under the following conditions, i.e. $\alpha = 20°$, $d/c = 3.0$ and $a/b = 0.28$.

As can be seen from FIG. 3, in the case of the conventional lug tire shown by dotted lines, a heavy ground contact pressure is subjected not only to the center region of the lug but also to both end regions thereof. On the contrary, in the lug tire according to the invention shown by a full line, the ground contact pressure subjected to both the end regions is significantly reduced if compared with that subjected to the center region.

As a result, the use of specially shaped lug pattern in the tire according to the invention ensures significant alleviation of oscillations of the tire and deviation of the handle when the tire runs. Moreover the agricultural machine is operated and provides the important advantage that there is no risk of the carcass cord at the root of the lug being involved into cut failure. The lug tire according to the invention, therefore, contributes greatly to industry.

What is claimed is:

1. In a lug tire for agricultural machines comprising a tread portion, a pair of side portions extending radially and inwardly from both side edges of the tread portion, a pair of bead portions connected to both ends of the side portions a reinforcing carcass, and lugs arranged in herringbone pattern on the tread along the circumferential direction of the tire, said lugs spaced apart from each other by a distance which is at least 1.5 times larger than the surface width of the lug located at an outer side edge thereof, the improvement comprising said lugs comprise a center region having a width corresponding to 15% to 30% of the maximum width of said tread inclusive of said lug and extending in parallel with the tire axis and a pair of inclined side regions extending from both edges of said center region to outer edges of said lugs and inclined in a position adjacent to said center region at an angle $\alpha$ of at least 15° with respect to the tire axis.

2. The lug tire according to claim 1, wherein said side regions of said lugs are inclined in the position adjacent to the center region at an angle of 15° to 25° with respect to the tire axis.

3. The lug tire according to claim 1, wherein said lugs are spaced apart from each other by a distance which is 3 times larger than the surface width of the lug at an outer edge thereof and have a center region having a width corresponding to about 28% of the maximum width of said tread inclusive of said lugs and a pair of side regions inclined at an angle of about 20° with respect to the tire axis.

* * * * *